Jan. 12, 1932.    F. R. MOORE    1,841,043
JOINERY MARKING GAUGE
Filed July 29, 1929
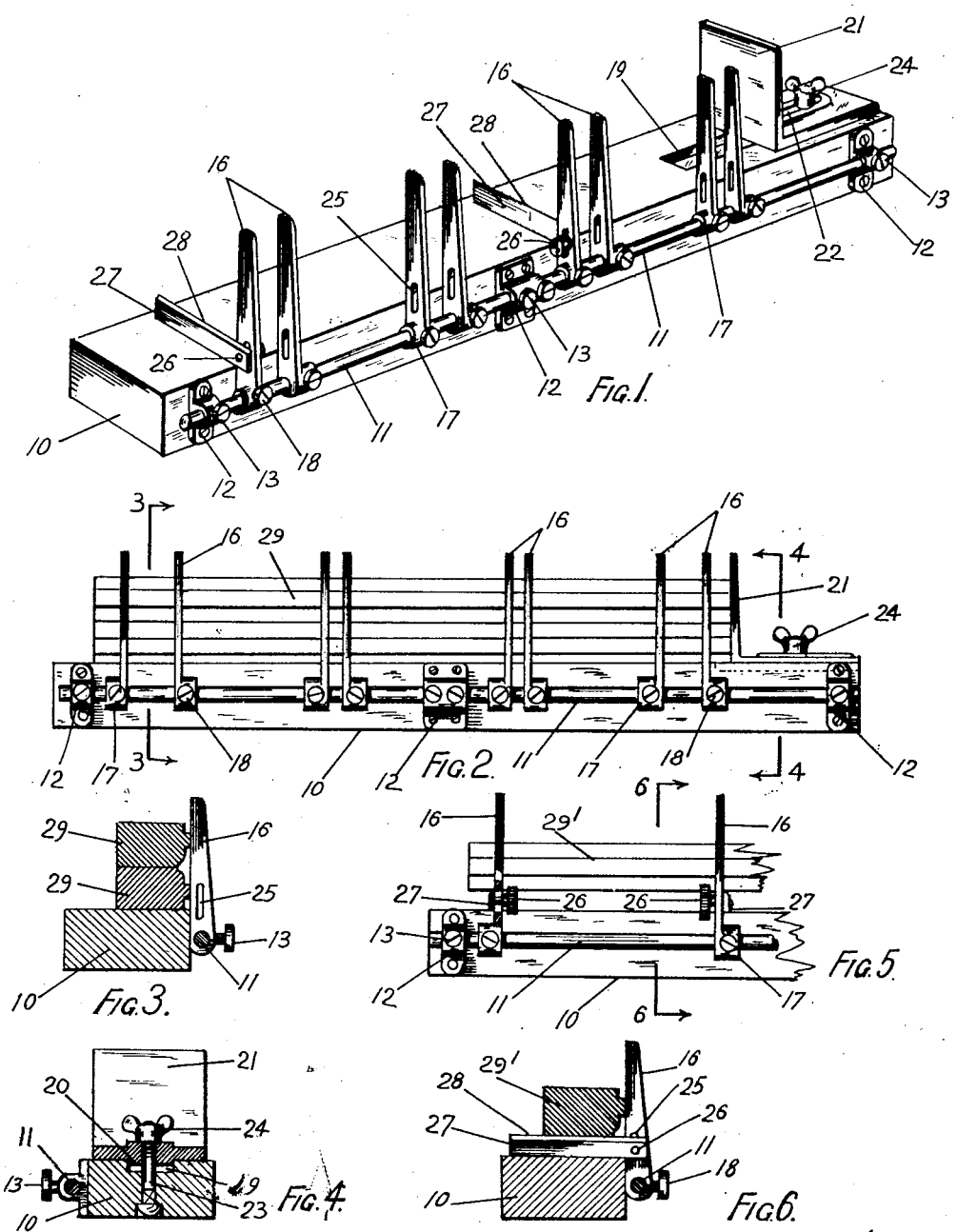

Patented Jan. 12, 1932

1,841,043

UNITED STATES PATENT OFFICE

FREDERICK RICHARD MOORE, OF MITTAGONG, NEW SOUTH WALES, AUSTRALIA

JOINERY MARKING GAUGE

Application filed July 29, 1929, Serial No. 381,919, and in Australia May 13, 1929.

The invention relates to gauges used in joinery for marking upon window stiles, rails or the like the cutting lines of mortises, tenons or other required formations.

In joinery, and particularly joinery relating to window sashes, there is considerable repetition work required in marking upon similar pieces the positions of the required cuts; the separate marking of such pieces is slow and difficult to perform uniformly, and the object of this invention is to facilitate such marking and to provide means whereby repetition marking may be rapidly and accurately performed simultaneously upon a plurality of similar pieces.

A further object of the invention is to provide a marking gauge by means of which the positions of any reasonable number of mortise cuts may be marked upon a plurality of similar pieces with one setting of the gauge.

The invention consists in a joinery marking gauge comprising a plurality of marking arms adjustable upon a mounting secured to a base and adapted to be used in pairs to mark upon a piece of timber, located on said base adjacent the arms, the positon of one or more mortises.

The invention also consists in a joinery marking gauge comprising a plurality of marking arms adjustable upon a mounting secured to a base, and each provided with a blade secured to it, said blades being adapted to lie in parallel relation transversely upon said base to mark the position of a tenon-cut at one or both ends of one or more pieces of timber located upon them.

The invention still further consists in a joinery marking gauge having the novel features as hereinafter described, set forth and claimed.

The above mentioned arms are adjustably mounted for preference upon a circular rod secured by brackets to a base, but any other form of adjustable mounting may be used.

The base is recessed and provided with an adjustable stop against which the pieces of timber are abutted to obtain a uniform and correct setting thereof.

Although the gauge is hereinafter described with reference to the marking of stiles, rails and bars of windows, it is to be understood that its use is not limited thereto, as the marking of the positions of any mortises and tenons, and of required lengths of timber, whether repetition work or otherwise, may be performed therewith.

The gauge may have any required number of arms, but it is found that four pairs are most suitable in practice.

In order to more fully describe and ascertain the invention reference will now be made to the accompanying drawings, which depict the preferred embodiment of the invention as applied to the marking of window frames and in which Fig. 1 is a perspective view of a marking gauge with the arms and blades in functional position thereon, Fig. 2 is a side elevation thereof without the blades and with two stiles in marking position thereon, Fig. 3 is a cross-sectional elevation taken on the line 3.3. of Fig. 2 and Fig. 4 a cross-sectional elevation on the line 4.4 of Fig. 2;

Fig. 5 is a part elevation of the gauge with the blades attached and with a rail in marking position thereon and Fig. 6 is an end elevation on the line 6.6 of Fig. 5.

Similar reference characters designate corresponding parts throughout the several figures of the drawings.

The gauge includes a base 10 consisting of a suitably sized rectangular piece of timber, and on one side thereof a rod 11 mounted in bearing brackets 12 secured to one side of the base. It is intended that the base 10 will be manufactured on the job by the workman and that the arms, blades, rod and stop bracket only will be permanent.

For convenience in transport the rod 11 is made in two lengths the juxtaposed ends of which are held in common in the central bracket 12 which for this purpose is made wider than the end brackets. The rod is held in the brackets by set screws 13.

Eight thin radial arms 16 are slidably fitted on the rod 11, each arm being formed at one end with a bored boss 17 fitting the rod and held in adjusted position by a set screw 18. The arms are use in pairs when the gauge is employed for marking mortises and separately when marking tenons, as hereinafter explained.

Base 10 is provided at one end on its upper surface with a longitudinal recess 19 into which fits a tongue 20 formed upon the under face of the horizontal member of a right angle stop bracket 21 slidable longitudinally on the base within the limits of recess 19. This member of the angle bracket has a slot 22 (Fig. 1) formed in it which registers with recess 19 when the bracket is in position upon the base, and the bracket is locked in the desired position upon the latter by means of a bolt 23, fitted with a wing nut 24, which passes through the base and slot 22, in known manner.

For the purpose of marking off lengths of timber or the position of tenons thereon each arm 16 has a slot 25 formed through it near its fixed end (but above the level of base 10 when the arm is vertical) through which passes a thumbscrew 26 (Fig. 5) which secures to the arm a blade 27, adapted to lie in a functional position edgewise and laterally on the base, and, when not required, to be rotated to an inoperative position remote from said base or to be removed from the arm. Blade 27 is provided with a marking edge 28 cut on the taper towards one side of the blade, the latter being normally secured to an arm in such manner that the marking edge lies adjacent the arm, as shown in Fig. 5.

In order to mark upon a number of stiles (or the like) the position of the mortises the arms 16 are locked vertically and in pairs upon the rods with the narrowest width of the corresponding mortise between the integers of each pair, and the pairs relatively positioned according to the required distance between the various mortises. As shown in Fig. 2 the two end pairs of arms are set for marking the rail mortises in the stile and the two middle pairs for marking the bar mortises. The stiles 29, two of which are shown in Figs. 2 and 3 are placed in superposition longitudinally upon the base with the beaded edges in contact with the arms and the ends abutting against the stop bracket. The lines for the mortises are then marked laterally upon this edge of the stiles by a scriber or the like drawn along the inner edge of each arm of each pair. The stiles are then turned to bring their back edges into contact with the arms and the lines for the mortises are then marked upon them by a scriber following the outer edges of the arms; the thickness of each of the arms 16 is equal to one half of the difference between the respective lengths, on opposite edges of the stiles, of the mortises to be cut therein, thereby causing the mortises marked on the latter edge to be wider than on the former edge, thus supplying the necessary mortise taper.

In order to mark the tenons, or the required lengths, upon rails, cut bars or the like, the blades 27 are attached, where required, to the arms and are located in the functional position upon the base as hereinbefore described.

The arms, with the attached blades, are set to the required distance from the stop bracket and a rail such as $29^1$ (Figs. 5 and 6) is laid upon the blades longitudinally of the base and abutted against the bracket with one edge in contact with the arms. Figs. 5 and 6 show the left hand arm and blade adjusted to mark the position of the shoulders of a tenon at that end of the rail and the right hand arm and blade adjusted to mark the required length of the rail.

A light blow is delivered to the rail above the blades, causing the latter to mark the rail at the required position; the rail is then inverted to bring the opposite side into contact with the blades and the marking is repeated.

If desired a tenon at either end may be marked upon the rail by the procedure described for the left hand end, and as many rails or the like as will lie upon the length of the blades may be marked simultaneously.

Obviously, the position of mortises or other cutting marks intermediate the ends of the rail (or the like) may be marked upon it at the same time by the correct adjustment of the intermediate arms and blades as above described, those arms not required being swung clear of the work.

For repetition work one setting only of the arms (or arms and blades) is required, the successive stiles, rails or the like being laid on the base (or on the blades) and abutted against the stop bracket and in contact with the arms, when the necessary markings are made upon them, resulting in very rapid and absolutely uniform marking of similar pieces.

What I claim and desire to secure by Letters Patent is:—

1. A joinery marking gauge comprising an elongated base, a plurality of arms, means mounting said arms on said base in a longitudinally adjustable manner with respect to said base and said arms being adapted to be used in pairs to mark upon the side of a piece of timber located on said base the required mortise cuts, a plurality of blades pivotally mounted respectively on the arms and adapted to transversely underlie the timber on the base to simultaneously mark thereon the required tenon cuts, and a stop bracket longitudinally adjustable on said base.

2. A joinery marking gauge according to claim 1, in which the arms, and the blades mounted thereon, are adjustable transversely of the base to move from an inoperative position clear of the base to an operative position against the base.

Signed at Sydney, New South Wales, Australia, this fifteenth (15th) day of June, A. D. 1929.

FREDERICK RICHARD MOORE.